United States Patent
Nyfors et al.

(10) Patent No.: US 11,179,690 B2
(45) Date of Patent: Nov. 23, 2021

(54) PROCESS AND APPARATUS FOR REMOVING POLYMER MATERIAL FROM A GAS-SOLIDS OLEFIN POLYMERIZATION REACTOR

(71) Applicant: Borealis AG, Vienna (AT)

(72) Inventors: Klaus Nyfors, Porvoo (FI); Erno Elovainio, Porvoo (FI); Vasileios Kanellopoulos, Linz (AT); Gunter Weickert, Ahaus (DE); Eric-Jan Prinsen, Aadorp (NL)

(73) Assignee: BOREALIS AG, Vienna (AT)

( * ) Notice: Subject to any disclaimer, the term of this patent is extended or adjusted under 35 U.S.C. 154(b) by 100 days.

(21) Appl. No.: 16/499,361

(22) PCT Filed: May 30, 2018

(86) PCT No.: PCT/EP2018/064207
§ 371 (c)(1),
(2) Date: Sep. 30, 2019

(87) PCT Pub. No.: WO2018/233999
PCT Pub. Date: Dec. 27, 2018

(65) Prior Publication Data
US 2021/0094008 A1   Apr. 1, 2021

(30) Foreign Application Priority Data
Jun. 23, 2017   (EP) .................................... 17177643

(51) Int. Cl.
*B01J 8/00*   (2006.01)
*B01J 8/18*   (2006.01)
(Continued)

(52) U.S. Cl.
CPC .......... *B01J 8/0055* (2013.01); *B01J 8/1827* (2013.01); *B01J 8/388* (2013.01); *C08F 10/00* (2013.01); *B01J 2208/00761* (2013.01)

(58) Field of Classification Search
USPC ................................... 526/68, 920; 422/131
See application file for complete search history.

(56) References Cited

U.S. PATENT DOCUMENTS 8,853,334 B2 * 10/2014 Hecker ..................... C08F 2/34
                                                                  526/88
2008/0177012 A1 * 7/2008 Penzo ..................... C08F 6/005
                                                                  526/68

FOREIGN PATENT DOCUMENTS

| EP | 0801081 A2 | 10/1997 |
| EP | 2495038 A1 | 9/2012 |
| EP | 2594333 A1 | 5/2013 |

OTHER PUBLICATIONS

International Search Report for PCT/EP2018/064207, dated Jul. 31, 2018.

* cited by examiner

*Primary Examiner* — Fred M Teskin
(74) *Attorney, Agent, or Firm* — Fay Sharpe LLP (57) ABSTRACT

The present invention relates to a process for removing polymer material from a gas-solids olefin polymerization reactor wherein the gas-solids olefin polymerization reactor is connected to the top part of an outlet vessel via a feed pipe wherein the powder surface of discharged polymer material and the barrier gas injection point are situated in the outlet vessel as such to fulfill the following criteria: $R'=X/Y \leq 2.0$; and $R''=X/D \geq 1.0$; wherein X=Distance between the powder surface and the barrier gas injection point; Y=Distance between the barrier gas injection point and the vessel outlet; and D=Equivalent outlet vessel diameter, an apparatus for (Continued)

continuously removing polymer material comprising a gas-solids olefin polymerization reactor, an outlet vessel and a feed pipe connecting the gas-solids olefin polymerization reactor with the top part of the outlet vessel and the use of said apparatus for polymerizing alpha-olefin homo- or copolymers having alpha-olefin monomer units of from 2 to 12 carbon atoms and for increasing the barrier gas efficiency of the gas-solids olefin reactor to at least 75%.

18 Claims, 2 Drawing Sheets

(51) Int. Cl.
*B01J 8/38* (2006.01)
*C08F 10/00* (2006.01)
*C08F 2/34* (2006.01)

PROCESS AND APPARATUS FOR REMOVING POLYMER MATERIAL FROM A GAS-SOLIDS OLEFIN POLYMERIZATION REACTOR

This is a 371 of PCT/EP2018/064207, filed May 30, 2018, which claims priority to European Patent Application Serial No. 17177643.8, filed Jun. 23, 2017, the contents of which are incorporated herein in their entirety.

The present invention relates to a process for removing polymer material from a gas-solids olefin polymerization reactor the use of said apparatus for polymerizing and the use of said apparatus for increasing the barrier gas efficiency of the gas-solids olefin polymerization reactor.

BACKGROUND

Gas phase reactors are commonly used for the polymerization of alpha-olefins such as ethylene and propylene as they allow relative high flexibility in polymer design and the use of various catalyst systems. A common gas phase reactor variant is the fluidized bed reactor.

For alpha-olefin polymerization gas phase reactors, such as fluidized bed reactors, are typically employed with outlet vessels in order to remove the particulate polymer material which is either sent to the downstream processing units or to subsequent reactor(s), such as especially in propylene polymerization where two or more subsequent reactor stages are employed to produce propylene polymers of different properties for a wide range of applications.

The challenge in operating the product outlet vessel is to remove the produced polymer powder with minimum amount of entrained gas mixture coming from the fluidized bed reactor via the vessel outlet. An increased amount of gas(es) in the polymer powder results in waste flaring and also can cause quality problems of the resulting polymer powder.

One way of reducing the amount of entrained gas mixture in the polymer powder is to operate the outlet vessel batch-wise so that the polymer powder can be depressurized in order to remove the entrained gas mixture. However, such an intermittent operation of the outlet vessel significantly increases the operating costs and creates more complexity during the continuous operation of the whole polymerization process. WO 00/29452, EP-A-2 330 135 and EP-A-2 594 333 disclose processes for continuously removing polymer material from fluidized bed reactors by means of outlet vessels. However, none of these documents is concerned with reducing the amount of entrained gas mixture from the polymer powder.

SUMMARY OF THE INVENTION

The present invention is based on the finding that by carefully designing the outlet vessel, especially carefully choosing the position of the powder surface and of the barrier gas injection point in the outlet vessel, the amount of entrained gas mixture in the polymer powder can be significantly reduced.

Thus, in one aspect the present invention relates to a process for removing polymer material from a gas-solids olefin polymerization reactor wherein the gas-solids olefin polymerization reactor is connected to the top part of an outlet vessel via a feed pipe, the process comprising the steps of:
(i) discharging polymer material from the fluidized bed reactor via the feed pipe into the outlet vessel;
(ii) establishing a powder surface of discharged polymer material within the outlet vessel in a section of the middle part of the outlet vessel;
(iii) injecting barrier gas through a barrier gas injection point in a section of the bottom part of the outlet vessel below the powder surface;
(iv) recovering polymer material from the outlet vessel through a vessel outlet in a section below the barrier gas injection point;

characterized in that
the powder surface and the barrier gas injection point are situated in the outlet vessel as such to fulfill the following criteria:

$$R' = X/Y \leq 2.0;$$

and $$R'' = X/D \geq 1.0;$$

wherein X=Distance between the powder surface and the barrier gas injection point; Y=Distance between the barrier gas injection point and the vessel outlet; and D=Equivalent outlet vessel diameter.

In another aspect the present invention relates to an apparatus for continuously removing polymer material comprising
a gas-solids olefin polymerization reactor, an outlet vessel and a feed pipe connecting the gas-solids olefin polymerization reactor with the top part of the outlet vessel, wherein the outlet vessel comprises
means for establishing a powder surface of discharged polymer material within the outlet vessel in a section of the middle part of the outlet vessel;
a barrier gas injection point in a section of the bottom part of the outlet vessel below the powder surface, and
a vessel outlet in a section below the barrier gas injection point; characterized in that
the powder surface and the barrier gas injection point are situated in the outlet vessel as such to fulfill the following criteria:

$$R' = X/Y \leq 2.0;$$

and $$R'' = X/D \geq 1.0;$$

wherein X=Distance between the powder surface and the barrier gas injection point; Y=Distance between the barrier gas injection point and the vessel outlet; and D=Equivalent outlet vessel diameter.

Further, the present invention relates to the use of said apparatus for polymerizing alpha-olefin homo- or copolymers having alpha-olefin monomer units of from 2 to 12 carbon atoms.

Still further, the present invention relates to the use of said apparatus for increasing the barrier gas efficiency of the gas-solids olefin polymerization reactor to at least 75%.

DETAILED DESCRIPTION

Definitions

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in m$^3$/s) divided by the cross-sectional area of the middle zone (in m$^2$) and the area occupied by the particles is thus neglected.

"Powder surface" means the upper surface of the powder of discharged polymer material in the outlet vessel and thus shows the upper level of discharged polymer material in the outlet vessel.

"Barrier gas" means gas that is introduced into the outlet vessel at the bottom part of the outlet vessel. The gas flows upwards in the outlet vessel through the discharged polymer material and helps to remove the entrained gas from the discharged polymer material. The barrier gas may be any gas which does not disturb the operation of the gas-solids olefin polymerization reactor. It may thus be an inert gas, such as propane or nitrogen, or, preferably, it may be the fluidization gas. When fluidization gas is used as the barrier gas the barrier gas stream is then preferably taken from the circulation gas stream downstream of the cooler (heat exchanger) and upstream of the reactor inlet.

"Entrained gas mixture" means the fluidization gas that is discharged together with polymer material from the gas-solids olefin polymerization reactor via the feed pipe into the outlet vessel. Depending on the polymerization process the entrained gas mixture can comprise monomer, comonomer, hydrogen, and inert gas such as propane, nitrogen.

By fluidization gas is meant the gas comprising monomer, and eventual comonomers, chain transfer agent and inert components which form the upwards flowing gas in the gas-solids olefin polymerization reactor and in which the polymer particles are suspended, e.g. in the fluidized bed of a fluidized bed reactor. The unreacted gas is collected at the top of the reactor, compressed, cooled and returned to the bottom of the reactor. As it is understood by the person skilled in the art the composition of the fluidization gas is not constant during the cycle. Reactive components are consumed in the reactor and they are added into the circulation line for compensating losses.

"Barrier gas efficiency" means the percentage of the entrained gas mixture that can be displaced by the barrier gas and it can be recycled to the gas-solids olefin polymerization reactor. Thus, the barrier gas efficiency is a measure for the entrained gas mixture in the polymer powder.

Unless specifically otherwise defined, the percentage numbers used in the text refer to percentage by weight.

Polymerization

The monomers polymerized in the process of the present invention are typically alpha-olefins having from 2 to 12 carbon atoms, preferably from 2 to 10 carbon atoms. Preferably, the olefins are ethylene or propylene, optionally together with one or more other alpha-olefins having from 2 to 8 carbon atoms. Especially preferably the process of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Thus, the polymer material is preferably selected from alpha-olefin homo- or copolymers having alpha-olefin monomer units of from 2 to 12 carbon atoms, preferably from 2 to 10 carbon atoms. Preferred are ethylene or propylene homo- or copolymers. The comonomer units of ethylene copolymers are preferably selected from one or more comonomers selected from alpha-olefins having from 4 to 8 carbon atoms. The comonomer units of propylene copolymers are preferably selected from one or more comonomers selected from ethylene and alpha-olefins having from 4 to 8 carbon atoms.

Polymerization Catalyst

The polymerization in the gas-solids olefin polymerization reactor is conducted in the presence of an olefin polymerization catalyst. The catalyst may be any catalyst which is capable of producing the desired olefin polymer. Suitable catalysts are, among others, Ziegler—Natta catalysts based on a transition metal, such as titanium, zirconium and/or vanadium catalysts. Especially Ziegler—Natta catalysts are useful as they can produce olefin polymers within a wide range of molecular weight with a high productivity.

Suitable Ziegler—Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 6 to 100 µm. However, it has turned out that special advantages can be obtained if the support has median particle size from 6 to 90 µm, preferably from 10 to 70 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler—Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler—Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stages

The polymerization in the gas-solids olefin polymerization reactor may be preceded by prior polymerization stages, such as prepolymerization or another polymerization stage conducted in slurry or gas phase. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

Gas-Solids Olefin Polymerization

In the gas-solids olefin polymerization reactor polymerization is conducted using gaseous olefin monomers in which the polymer particles are growing.

The present process is suitable for any kind of gas-solids olefin polymerization reactors suitable for the polymerization of alpha-olefin homo- or copolymers. Suitable reactors are e.g. continuous-stirred tank reactors or fluidized bed reactors. Both types of gas-solids olefin polymerization reactors are well known in the art.

Preferably the gas-solids olefin polymerization reactor is a fluidized bed reactor.

In a fluidized bed reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

Thereby, the fluidized bed reactor can comprise a distribution plate which is situated below the fluidized bed. In such a fluidized bed reactor the feed pipe is usually connected to the fluidized bed reactor above the distribution plate at a position higher than ⅛, preferably at a position higher than ⅙, most preferably at a position higher than ⅓ of the effective diameter of the distribution plate measured from the distribution plate in vertical direction. Such a fluidized bed reactor with a distribution plate is described in EP-A-2 594 333.

In a preferred embodiment the fluidized bed reactor does not comprise a distribution plate. The polymerization takes place in a reactor including a bottom zone, a middle zone and a top zone. The bottom zone forms the lower part of the reactor in which the base of the fluidized bed is formed. The base of the bed forms in the bottom zone with no fluidization grid, or gas distribution plate, being present. Above the bottom zone and in direct contact with it is the middle zone. The middle zone and the upper part of the bottom zone contain the fluidized bed. Because there is no fluidization grid there is a free exchange of gas and particles between the different regions within the bottom zone and between the bottom zone and the middle zone. Finally, above the middle zone and in direct contact therewith is the top zone.

The upwards moving gas stream is established by withdrawing a fluidization gas stream from the top zone of the reactor, typically at the highest location. The gas stream withdrawn from the reactor is then compressed and cooled and re-introduced to the bottom zone of the reactor. Preferably, the gas is filtered before being passed to the compressor. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

The circulation gas line preferably comprises at least one cyclone. The cyclone has the objective of removing the entrained polymer material from the circulation gas. The polymer stream recovered from the cyclone can be directed to another polymerization stage, or it may be returned into the fluidized bed reactor or it may be withdrawn as the polymer product.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed. Such a fluidized bed reactor without distribution plate is described in EP-A-2 495 037 and EP-A-2 495 038.

Removal of Polymer Material

Polymer material is withdrawn from the gas-solids olefin polymerization reactor. As it was discussed above, one part of the polymer material may be withdrawn by using the cyclone installed in the circulation gas stream. However, the amount of polymer material withdrawn therefrom is usually not sufficient for withdrawing the whole polymer material production from the gas-solids olefin polymerization reactor. Therefore, polymer material is also discharged from the gas-solids olefin polymerization reactor from a suitable area, especially preferably from the middle zone of a fluidized bed reactor.

The polymer material is withdrawn from a suitable area, preferably from the middle zone of the fluidization reactor, via the feed pipe into the outlet vessel, preferably through the top part of the outlet vessel. Thereby, the polymer material usually is discharged in form of polymer powder. The polymer powder can additionally comprise agglomerates.

In general, the polymer material can be withdrawn from the gas solid olefin polymerization reactor intermittently or continuously. It is preferred to withdraw the polymer material continuously.

One preferred way of establishing continuously discharge of polymer material or in other words continuous flow is by using a continuously operated control valve. The continuously operated control valve can be located in the feed pipe or in the return gas line connecting the outlet vessel and the gas phase reactor.

Flush gas may be used to enhance transport of the polymer material from the gas-solids olefin polymerization reactor to the outlet vessel.

The outlet vessel preferably has a main part, a bottom part and a top part. As a matter of definition, the main part is the part which has the highest effective diameter, whereas the bottom part is the part which has lower effective diameter than the main part. The top part merely is a closure of the outlet vessel.

For the sake of the present invention the equivalent outlet vessel diameter D denotes the effective diameter of the main part of the outlet vessel.

The outlet vessel comprises a barrier gas injection point in the bottom part of the outlet vessel through which barrier gas is injected into the outlet vessel.

The barrier gas preferably is an inert gas, such as propane or nitrogen, or, preferably, it may be the fluidization gas.

The barrier gas is preferably introduced in an amount which is about the same as or higher than the flow of the entrained gas mixture introduced into the outlet vessel together with the discharged polymer material.

The ratio of the flow rate of the barrier gas to the flow rate of the entrained gas mixture in volumetric basis is preferably from 0.5 to 2.5, more preferably from 0.8 to 2.0, even more preferably from 1.0 to 1.8 and in particular from 1.0 to 1.5. For instance, a ratio of about 1.1 has been found to give good results.

The polymer material is usually discharged from the fluidized bed reactor with a velocity of at least 5 cm/s, preferably at least 10 cm/s, more preferably at least 12 cm/s. The upper limit is usually not higher than 100 cm/s.

In the outlet vessel a powder surface of discharged polymer material is established in a section of the middle part of the outlet vessel.

Preferably the powder surface is established by extending the feed pipe into the middle part of the outlet vessel to form a dip tube. The powder surface is then preferably established at the lower end of the dip tube.

Thereby, the lower end of the dip tube is situated within the middle part of the outlet vessel as such to fulfill the following criterion:

$$R''' = W/L = 0.1 \text{ to } 0.5;$$

wherein W=Distance between the top part of the outlet vessel and the lower end of the dip tube; and L=Distance between the top part of the outlet vessel and the vessel outlet equivalent to the total vertical length of the outlet vessel. W is thereby measured from the lower end of the dip tube in vertical direction and L is measured from the vessel outlet in vertical direction.

$R'''$ is preferably in the range of 0.2 to 0.5, more preferably 0.3 to 0.5 and most preferably 0.35 to 0.45.

The powder surface and the barrier gas injection point are situated in the outlet vessel as such to fulfill the following criteria:

$$R' = X/Y \leq 2.0;$$

and $$R'' = X/D \geq 1.0;$$

wherein X=Distance between the powder surface and the barrier gas injection point; Y=Distance between the barrier gas injection point and the vessel outlet; and D=Equivalent outlet vessel diameter. X is thereby measured from barrier gas injection point in vertical direction and Y is measured from the vessel outlet in vertical direction. D is the effective diameter of the main part of the outlet vessel.

$R''$ is preferably at least 1.1, more preferably at least 1.2, and most preferably at least 1.5. The upper limit of $R''$ is usually not higher than 3.0, preferably not higher than 2.5 and most preferably not higher than 2.0.

$R'$ is preferably not higher than 1.8, more preferably not higher than 1.5, still more preferably not higher than 1.2 and most preferably not higher than 1.0. The lower limit of $R'$ is usually at least 0.01, preferably at least 0.1 and most preferably at least 0.35.

By situating the powder surface and the barrier gas injection point in the outlet vessel according to criteria $R'$ and $R''$ the amount of entrained gas mixture in the polymer powder withdrawn from the outlet vessel though the vessel outlet surprisingly is significantly reduced. Preferably, the barrier gas efficiency, which is the percentage of the entrained gas mixture, escaped from the gas-solids olefin polymerization reactor through the vessel outlet, that can be displaced by the barrier gas, is at least 75%, more preferably at least 85%, still more preferably at least 90% and most preferably more than 95%.

The process of the present invention preferably further comprises the step of recovering gas from the top part of the outlet vessel and returning said gas to the gas-solids olefin polymerization reactor through return gas pipe. The return gas preferably comprises the entrained gas mixture in the polymer powder and the barrier gas. Optionally the return gas can further comprise flush gas which was used to enhance transport of the polymer material from the gas-solids olefin polymerization reactor to the outlet vessel.

Post-Reactor Treatment

When the polymer material has been recovered from the outlet vessel through the vessel outlet it can be subjected to process steps for removing residual hydrocarbons from the polymer material. Such processes are well known in the art and can include pressure reduction steps, purging steps, stripping steps, extraction steps and so on. Also combinations of different steps are possible.

In general, the polymer material can be recovered from the outlet vessel through the vessel outlet intermittently or continuously. It is preferred to recover the polymer material continuously.

According to one possible process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another possible process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer material, such as steam.

The purging steps are preferably conducted continuously in a settled moving bed. The polymer material moves downwards as a plug flow and the purge gas, which is introduced to the bottom of the bed, flows upwards.

Suitable processes for removing hydrocarbons from polymer material are disclosed in WO-A-02/088194, EP-A-683176, EP-A-372239, EP-A-47077 and GB-A-1272778.

By means of the process according to the invention the amount of entrained gas mixture such as unreacted hydrocarbons in the polymer powder is significantly reduced so that the above described purging steps can be significantly reduced or even completely avoided.

After the optional removal of residual hydrocarbons the polymer material is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Apparatus

The apparatus according to the present invention comprises a gas-solids olefin polymerization reactor, an outlet vessel and a feed pipe connecting the gas-solids olefin polymerization reactor with the top part of the outlet vessel.

Thereby, the apparatus is suitable for removing polymer material from a gas-solids olefin polymerization reactor according to the process of the present invention in all embodiments as described above.

Preferably the powder surface in the outlet vessel is established by a dip tube that extends from the feed pipe into the middle part of the outlet vessel and the powder surface is established at the lower end of the dip tube.

Thereby, wherein the lower end of the dip tube is situated within the middle part of the outlet vessel as such to fulfill the following criterion:

$$R'''=W/L=0.1 \text{ to } 0.5;$$

wherein W=Distance between the top part of the outlet vessel and the lower end of the dip tube; and L=Distance between the top part of the outlet vessel and the vessel outlet equivalent to the total vertical length of the outlet vessel. W is thereby measured from the lower end of the dip tube in vertical direction and L is measured from the vessel outlet in vertical direction.

R''' is preferably in the range of 0.2 to 0.5, more preferably 0.3 to 0.5 and most preferably 0.35 to 0.45.

The powder surface and the barrier gas injection point are situated in the outlet vessel as such to fulfill the following criteria:

$$R'=X/Y \leq 2.0;$$

and $$R''=X/D \geq 1.0;$$

wherein X=Distance between the powder surface and the barrier gas injection point; Y=Distance between the barrier gas injection point and the vessel outlet; and D=Equivalent outlet vessel diameter. X is thereby measured from barrier gas injection point in vertical direction and Y is measured from the vessel outlet in vertical direction. D is the effective diameter of the main part of the outlet vessel.

R'' is preferably at least 1.0, more preferably at least 1.2, and most preferably at least 1.5. The upper limit of R'' is usually not higher than 3.0, preferably not higher than 2.5 and most preferably not higher than 2.0.

R' is preferably not higher than 1.8, more preferably not higher than 1.5, still more preferably not higher than 1.2 and most preferably not higher than 1.0. The lower limit of R' is usually at least 0.01, preferably at least 0.1 and most preferably at least 0.35.

The apparatus preferably further comprises a return gas pipe connecting the top part of the outlet vessel and the gas-solids olefin polymerization reactor.

Use

The present invention is further related to the use of the apparatus of the present invention for polymerizing alpha-olefin homo- or copolymers having alpha-olefin monomer units of from 2 to 12 carbon atoms.

Further, the present invention is related to the use of apparatus of the apparatus of the present invention for increasing the barrier gas efficiency of the gas-solids olefin polymerization reactor to at least 75%, more preferably at least 85%, still more preferably at least 90% and most preferably more than 95%.

Thereby, for both uses the apparatus and the process include all embodiments as described above.

Benefits of the Invention

By situating the powder surface and the barrier gas injection point in the outlet vessel according to criteria R' and R'' the amount of entrained gas mixture in the polymer powder withdrawn from the outlet vessel though the vessel outlet surprisingly is significantly reduced.

A continuous polymer flow is obtained in the outlet vessel under bulk flow conditions without barrier gas bubbling, slug formation and channeling (e.g. gas wall flow, up and down gas flow).

As a consequence the above described post-reactor treatment can be significantly reduced or even completely avoided which results in reduced operating costs and in improved product quality.

FIGURES (1) Fluidized bed reactor
(2) Outlet vessel
(3) Distribution plate (fluidized bed reactor with distribution plate)
(4) Feed pipe
(5) Dip tube
(6) Gas inlet
(8) Barrier gas injection point
(9) Catalyst inlet
(10) Disengaging zone (fluidized bed reactor with distribution plate)
(11) Gas outlet
(12) Solids filter (fluidized bed reactor with distribution plate)
(13) Means for pressuring
(14) Means for cooling
(15) Bottom zone (fluidized bed reactor without distribution plate)
(16) Middle zone (fluidized bed reactor without distribution plate)
(17) Upper zone (fluidized bed reactor without distribution plate)
(19) Return gas pipe
(20) Vessel outlet
(21) Gas-solids separation means (fluidized bed reactor without distribution plate)
(22) Line for downstream processing (fluidized bed reactor without distribution plate)
(23) Line for solids return (fluidized bed reactor without distribution plate)

Figure 1:
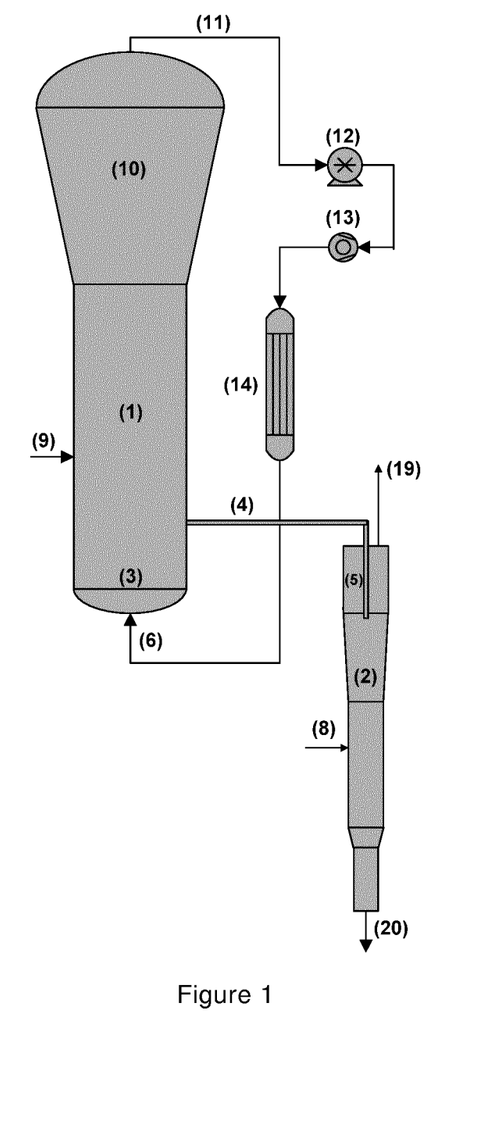
FIG. 1 is a schematic drawing of an embodiment of a fluidized bed reactor comprising a distribution plate.
Figure 2:
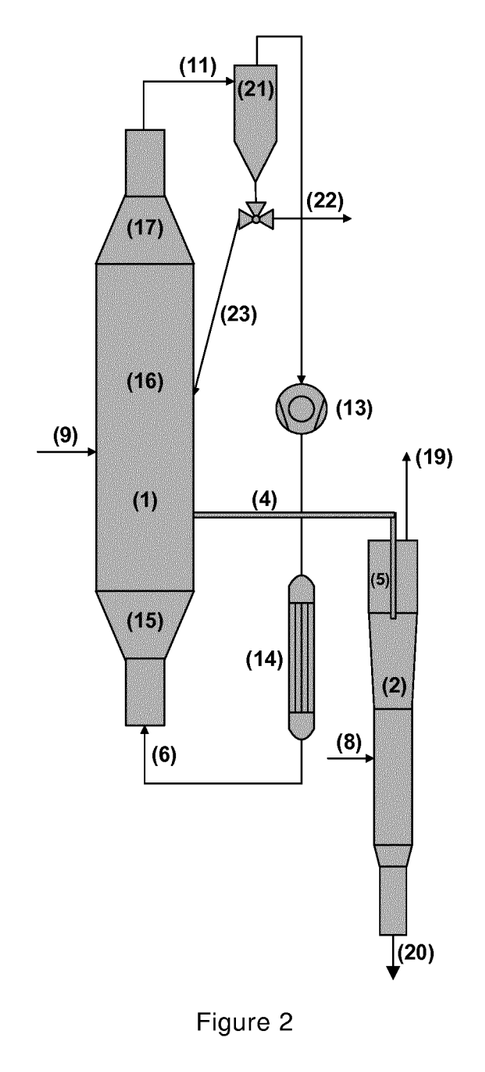
FIG. 2 is a schematic drawing of an embodiment of a fluidized bed reactor which does not comprise a distribution plate.

In FIGS. 1 to 2 the reactor assembly according to the invention for the process and apparatus for removing polymer material from a gas-solids olefin polymerization reactor is further illustrated.

The reactor assembly includes a gas-solids olefin polymerization reactor, illustrated by means of a fluidized bed reactor (1), and an outlet vessel (2) that is adjacent to the fluidized bed reactor (1).

Monomer, optionally comonomer, certain catalyst components and/or chain growth controller or chain transfer agent and/or fluidization gas enter the fluidized bed reactor (1) through inlet (6) at the lower part of the fluidized bed reactor (1) thereby forming the reaction gas. These streams can also be introduced to the fluidized bed reactor (1) through separate inlets (6) at the lower end of the fluidized bed reactor (1).

FIG. 1 is related to an embodiment in which the fluidized bed reactor comprises a distribution plate. The reaction gas enters the fluidization reactor (1) via the distribution plate (3). The catalyst or catalyst containing prepolymer from an earlier reaction stage enter the fluidized bed reactor (1) through a separate inlet (9) at the side wall at the height of the reaction zone of the fluidized bed reactor. In this embodiment the fluidized bed reactor (1) is of cylindrical shape.

In the fluidized bed reactor (1) a fluidized bed of catalytic particles is generated and maintained in the reaction zone on which particles further polymer material is formed due to the polymerization reaction. At the top of the fluidized bed reactor (1) the polymer particles are separated from the gas in a disengaging zone (10). The gas leaves the fluidized bed reactor (1) through gas outlet (11) at the upper end of the fluidized bed reactor (1). The gas can be separated from optional polymer particles in solids filter (12), repressurized (13), cooled (14), optionally recycled and then recirculated to gas inlet (6) of the fluidized bed reactor (1).

A part of the polymer particles leave the fluidized bed reactor through a polymer outlet and are transferred to the top of the adjacent outlet vessel (2) through feed pipe (4). The feed pipe is extended into the middle part of the outlet vessel (2) by means of a dip tube (5). In the outlet vessel (2) the particles form a bed of settled polymer particles which move slowly downwardly in a more or less plug stream towards the outlet at the bottom of the outlet vessel (2). The powder surface is established at the lower end of the dip tube (5) in the middle part of the outlet vessel (2). Barrier gas (i.e., recycled gas, diluent or inert gas) enters the outlet vessel (2) through barrier gas injection point (8) at the side wall of the outlet vessel (2). In the bed of polymer particles no further polymer material is formed since there is no polymerization reaction.

The barrier gas injection point (8) and the lower end of the dip tube (5) are situated in the outlet vessel (2) as such that the claimed ratios R' and R" are met.

A large part of barrier gas fed in the outlet vessel through barrier gas injection point (8) as well as the displaced gas(es) which have been transferred from the fluidized bed reactor (1) through the feed pipe (4) are removed from the outlet vessel (2) through the return gas pipe (19). The polymer particles are removed from the bottom of the outlet vessel (2) though vessel outlet (20) and they are further processed.

In FIG. 2 relating to an embodiment in which the fluidized bed reactor does not comprise a distribution plate the fluidized bed reactor has a cone shaped bottom zone (15), a cylindrical shaped middle zone (16) and a cone shaped upper zone (17). In this embodiment the fluidized bed reactor has an inlet (6) for the reaction gas located in the bottom zone (15). The inlet(s) (9) for the catalyst or catalyst containing prepolymer from an earlier reaction stage is situated in the middle zone (16) of the fluidized bed reactor (1).

From the top of the upper zone (17) gas and optionally polymer particles are withdrawn. The polymer particles are separated from the gas in gas-solids separation means (21) and are either further processed (22) or re-introduced to the fluidized bed reactor (1) through inlet (23). The gas can be repressurized (13), cooled (14), optionally recycled and then recirculated to gas inlet (6) of the fluidized bed reactor (1).

EXAMPLES

Example 1

Reference

In this example, the powder surface in the outlet vessel is established at the lower end of a dip tube that extends from the feed pipe into the outlet vessel. The diameter of the dip tube was equal to 50 mm and the distance between the top part of the outlet vessel (i.e., end of the feed pipe) and the dip tube lower end was equal to 400 mm. The employment of the dip tube was majorly contributed in establishing a settled powder bed in the outlet vessel with constant height during the unit operation without disturbances/oscillations (i.e., periodical emptying and filling of the outlet vessel). The polymer powder flow was selected to be 200 Kg/h and the distance between the powder surface and the barrier gas injection point was 130 mm while the distance between the barrier gas injection point and the outlet vessel outlet was 500 mm. The barrier gas flow rate was set to be equal to the gases that are entrained by the polymer material (~120 l/h). The barrier efficiency (it determines the percentage of the entrained gases that can be displaced by the barrier gas) was measured equal to be equal to 56%.

Example 2

Reference

In this example, the same outlet vessel configuration and powder flow as in Example 1 were selected. The distance between the powder surface and the barrier gas injection point was 460 mm while the distance between the barrier gas injection point and the outlet vessel outlet was 170 mm. The barrier gas flow rate was set to be equal to the gases that are entrained by the polymer material (~120 l/h). The barrier efficiency (it determines the percentage of the entrained gases that can be displaced by the barrier gas) was measured equal to be equal to 35%.

Example 3

Inventive

In this example, the same outlet vessel configuration and powder flow as in Example were selected. The distance between the powder surface and the barrier gas injection point was 230 mm while the distance between the barrier gas injection point and the outlet vessel outlet was 400 mm. The barrier gas flow rate was set to be equal to the gases that are entrained by the polymer material (~120 l/h). The barrier efficiency (it determines the percentage of the entrained gases that can be displaced by the barrier gas) was measured to be equal to 98%.

Example 4

Reference

In this example, the outlet vessel configuration used in the previous examples has changed. More specifically, the dip tupe was removed and the powder was introduced into the outlet vessel through the feed pipe located at the top of the outlet vessel. The distance between the top of the outlet vessel (i.e., end of the feed pipe) and the barrier gas injection point was 630 mm while the distance between the barrier gas injection point and the end point of the outlet vessel was 400 mm. The barrier gas flow rate was set to be equal to the gases that are entrained by the polymer material (~120 l/h). Since the beginning of the operation, it was not possible to establish a constantly flowing bed of solids. In other words, the established powder surface of the discharged polymer material within the outlet vessel was changing position (i.e. increase and decrease following a chaotic behavior) with respect to outlet vessel height, thus the powder level in the outlet vessel was heavily oscillating leading to periodical emptying and filing of the outlet vessel. In addition, the polymer flow at the exit of the outlet vessel was not constant and the barrier efficiency (it determines the percentage of the entrained gases that can be displaced by the barrier gas) was measured to be equal to 23%.

Example 5

Reference

In this example, the outlet vessel configuration used in Example 4 was employed. The distance between the top of the outlet vessel and the barrier gas injection point was 860 mm while the distance between the barrier gas injection point and the end point of the outlet vessel was 170 mm. The barrier gas flow rate was set to be equal to the gases that are entrained by the polymer material (~120 l/h). Since the beginning of the operation, it was not possible to establish a constantly flowing bed of solids.

In other words, the established powder surface of the discharged polymer material within the outlet vessel was changing position (i.e., increase and decrease following a chaotic behavior) with respect to outlet vessel height, thus the powder level in the outlet vessel was heavily oscillating leading to periodical emptying and filing of the outlet vessel. In addition, the polymer flow at the exit of the outlet vessel was not constant and the barrier efficiency (it determines the percentage of the entrained gases that can be displaced by the barrier gas) was measured to be equal to 19%.

Example 6

Reference

In this example, the outlet vessel configuration used in Example 4 was employed. The distance between the top of the outlet vessel and the barrier gas injection point was 530 mm while the distance between the barrier gas injection point and the end point of the outlet vessel was 500 mm. The barrier gas flow rate was set to be equal to the gases that are entrained by the polymer material (~120 l/h,). Since the beginning of the operation, it was not possible to establish a constantly flowing bed of solids. In other words, the established powder surface of the discharged polymer material within the outlet vessel was changing position (i.e., increase and decrease following a chaotic behavior) with respect to outlet vessel height, thus the powder level in the outlet vessel was heavily oscillating leading to periodical emptying and filing of the outlet vessel. In addition, the polymer flow at the exit of the outlet vessel was not constant and the barrier efficiency (it determines the percentage of the entrained gases that can be displaced by the barrier gas) was measured to be equal to 21%.

TABLE 1

Examples summary

| Examples | Powder Flow [Kg/h] | Barrier gas Flow [l/h] | R' | R" | Barrier Gas Efficiency [%] | Operation |
| --- | --- | --- | --- | --- | --- | --- |
| #1 | 200 | 120 | 0.26 | 0.87 | 56 | Smooth |
| #2 | 200 | 120 | 2.70 | 3.10 | 35 | Smooth |
| #3 | 200 | 120 | 0.58 | 1.55 | 98 | Smooth |
| #4 | 200 | 120 | na* | na* | 23 | Unstable |
| #5 | 200 | 120 | na* | na* | 19 | Unstable |
| #6 | 200 | 120 | na* | na* | 21 | Unstable | na*: not measured due to severe oscillating behaviour of the powder level into the outlet vessel

The invention claimed is:

1. A process for removing polymer material from a gas-solid olefin polymerization reactor wherein the gas-solid olefin polymerization reactor is connected to a top part of an outlet vessel via a feed pipe, the process comprising the steps of:
   (i) discharging polymer material from the gas-solid olefin polymerization reactor via the feed pipe into the outlet vessel;
   (ii) establishing a powder surface of discharged polymer material within the outlet vessel in a section of a middle part of the outlet vessel;
   (iii) injecting barrier gas through a barrier gas injection point in a section of a bottom part of the outlet vessel below the powder surface;
   (iv) recovering polymer material from the outlet vessel through a vessel outlet in a section below the barrier gas injection point;
   characterized in that
   the powder surface and the barrier gas injection point are situated in the outlet vessel as such to fulfill the following criteria:

$R' = X/Y \leq 2.0;$ and $R'' = X/D \geq 1.0;$ wherein X=Distance between the powder surface and the barrier gas injection point; Y=Distance between the barrier gas injection point and the vessel outlet; and D=Equivalent outlet vessel diameter.

2. The process of claim 1, wherein the powder surface is established by extending the feed pipe into the middle part of the outlet vessel to form a dip tube and the powder surface is established at the lower end of the dip tube.

3. The process of claim 2, wherein the lower end of the dip tube is situated within the middle part of the outlet vessel as such to fulfill the following criterion:

$R''' = W/L = 0.1 \text{ to } 0.5;$ wherein W=Distance between the top part of the outlet vessel and the lower end of the dip tube; and L=Distance between the top part of the outlet vessel and the vessel outlet equivalent to the total vertical length of the outlet vessel.

4. The process of claim 1, wherein the polymer material is discharged from the gas-solid olefin polymerization reactor with a velocity of at least 5 cm/s.

5. The process of claim 1, wherein the ratio of the flow rate of the barrier gas to the flow rate of the entrained gas mixture in the polymer material recovered in step (iv) in volumetric basis is from 0.5 to 2.5.

6. The process of claim 1, wherein the ratio of the flow rate of the barrier gas to the flow rate of the entrained gas mixture in the polymer material recovered in step (iv) in volumetric basis is from 0.8 to 2.0.

7. The process of claim 1, wherein the ratio of the flow rate of the barrier gas to the flow rate of the entrained gas mixture in the polymer material recovered in step (iv) in volumetric basis is from 1.0 to 1.8.

8. The process of claim 1, wherein the ratio of the flow rate of the barrier gas to the flow rate of the entrained gas mixture in the polymer material recovered in step (iv) in volumetric basis is from 1.0 to 1.5.

9. The process of claim 1 further comprising the step of recovering gas from the top part of the outlet vessel and returning said gas to the gas-solid olefin polymerization reactor through return gas pipe.

10. The process of claim 1, wherein the polymer material is selected from alpha-olefin homo- or copolymers having alpha-olefin monomer units of from 2 to 12 carbon atoms.

11. The process of claim 1, wherein the barrier gas is selected from inert gas or fluidization gas.

12. The process of claim 1, wherein the barrier gas efficiency, being the percentage of the entrained gas mixture, escaped from the gas-solids olefin polymerization reactor through the vessel outlet, that can be displaced by the barrier gas, is at least 75%.

13. An apparatus for continuously removing polymer material comprising
    a gas-solids olefin polymerization reactor, an outlet vessel and a feed pipe connecting the gas-solids olefin polymerization reactor with a top part of the outlet vessel, wherein the outlet vessel comprises
    means for establishing a powder surface of discharged polymer material within the outlet vessel in a section of a middle part of the outlet vessel;
    a barrier gas injection point in a section of a bottom part of the outlet vessel below the powder surface, and
    a vessel outlet in a section below the barrier gas injection point;
    characterized in that
    the powder surface and the barrier gas injection point are situated in the outlet vessel as such to fulfill the following criteria:

$R' = X/Y \leq 2.0;$ and $R'' = X/D \geq 1.0;$ wherein X=Distance between the powder surface and the barrier gas injection point; Y=Distance between the barrier gas injection point and the vessel outlet; and D=Equivalent outlet vessel diameter.

14. The apparatus of claim 13, wherein the means for establishing the powder surface comprises a dip tube that extends from the feed pipe into the middle part of the outlet vessel and the powder surface is established at the lower end of the dip tube.

15. The apparatus of claim 14, wherein the lower end of the dip tube is situated within the middle part of the outlet vessel as such to fulfill the following criterion:

$R''' = W/L = 0.1 \text{ to } 0.5;$ wherein W=Distance between the top part of the outlet vessel and the lower end of the dip tube; and L=Distance between the top part of the outlet vessel and the vessel outlet equivalent to the total vertical length of the outlet vessel.

16. The apparatus of claim 13 further comprising a return gas pipe connecting the top part of the outlet vessel and the gas-solid olefin polymerization reactor.

17. A polymerization method comprising:
    polymerizing alpha-olefin homo- or copolymers having alpha-olefin monomer units of from 2 to 12 carbon atoms in the apparatus of claim 13.

18. A method for increasing a barrier gas efficiency of a gas-solids olefin polymerization reactor to at least 75% comprising:
    polymerizing alpha-olefin homo- or copolymers having alpha-olefin monomer units of from 2 to 12 carbon atoms in the apparatus of claim 13.

* * * * *